United States Patent
Sinsabaugh (10) Patent No.: US 8,061,651 B2
(45) Date of Patent: Nov. 22, 2011

(54) AIRSHIP PHOTOCATALYTIC REACTOR ENERGY GENERATION, STORAGE, AND PIPELESS TRANSMISSION SYSTEMS

(75) Inventor: Steven L. Sinsabaugh, Uniontown, OH (US)

(73) Assignee: Lockheed Martin Corporation, Akron, OH (US)

( * ) Notice: Subject to any disclaimer, the term of this patent is extended or adjusted under 35 U.S.C. 154(b) by 790 days.

(21) Appl. No.: 12/031,331

(22) Filed: Feb. 14, 2008

(65) Prior Publication Data

US 2009/0206194 A1  Aug. 20, 2009

(51) Int. Cl.
*B64B 1/00* (2006.01)

(52) U.S. Cl. .............. 244/61; 244/97; 244/58

(58) Field of Classification Search ............ 244/61, 244/58, 97, 30
See application file for complete search history.

(56) References Cited

U.S. PATENT DOCUMENTS

| | | | |
|---|---|---|---|
| 130,915 A * | 8/1872 | Haenlein ............ 244/61 |
| 1,426,047 A * | 8/1922 | Cooke ............ 244/61 |
| 1,802,586 A * | 4/1931 | Stokes ............ 244/61 |
| 5,234,777 A * | 8/1993 | Wilson ............ 429/490 |
| 5,336,570 A * | 8/1994 | Dodge, Jr. ............ 429/465 |
| 5,348,254 A * | 9/1994 | Nakada ............ 244/97 |
| 5,449,443 A | 9/1995 | Jacoby et al. |
| 5,683,589 A | 11/1997 | Lasa et al. |
| 5,862,449 A | 1/1999 | Bischoff et al. |
| 6,119,979 A * | 9/2000 | Lee et al. ............ 244/97 |
| 6,131,851 A * | 10/2000 | Williams ............ 244/61 |
| 6,224,016 B1 * | 5/2001 | Lee et al. ............ 244/30 |
| 6,425,552 B1 * | 7/2002 | Lee et al. ............ 244/61 |
| 6,524,536 B2 | 2/2003 | Newman et al. |
| 6,896,222 B2 | 5/2005 | Dossas et al. |
| 6,908,702 B2 * | 6/2005 | McElroy et al. ............ 244/30 |
| 2004/0028966 A1 | 2/2004 | Hibbs et al. |
| 2006/0042846 A1 | 3/2006 | Kojori et al. |

FOREIGN PATENT DOCUMENTS

WO  WO 2004/015796 A3  2/2004

* cited by examiner

*Primary Examiner* — Galen Barefoot (74) *Attorney, Agent, or Firm* — Daniel J. Schlue; Roetzel & Andress (57) ABSTRACT

An energy management system for lighter-than-air vehicles which includes a reactor means for generating energy, storage means for storing the reactants used in the reactor means, and an integrated pipeless reactant and power distribution means.

14 Claims, 6 Drawing Sheets

Fig. 12

AIRSHIP PHOTOCATALYTIC REACTOR ENERGY GENERATION, STORAGE, AND PIPELESS TRANSMISSION SYSTEMS

BACKGROUND OF THE INVENTION

The present invention is related to energy management systems, including the generation, storage, and transmission systems for lighter-than-air (LTA) vehicles.

Previous solutions to airship energy generation and storage have used 'stand-alone' power systems: i.e. discrete batteries or regenerative fuel cell systems, discrete solar panels, discrete electrical power distribution cables. Conventional airship power system design includes a solar array at the top of the airship, which is accessible to direct sunlight, and the energy storage system (batteries or regenerative fuel cells) at the bottom of the airship, due to airship stability requirements. This architecture requires a significant mass of electrical conductors to carry the power from the solar array to the energy storage system. This conductor mass can amount to hundreds or even thousands of pounds. Additional cables are then required to distribute power, either directly from the solar array, or from the energy storage system, to the main electrical loads such as propulsors and blowers, often located at widely dispersed locations on the airship. These cable runs also add significant weight.

Generation, transmission and storage of energy for a long-duration airship requires extremely heavy components, and has significant inefficiencies. This weight and inefficiency significantly impacts the potential capability of projected long-duration airships. A fundamental flaw is the attempt to impose a satellite-power architecture (i.e. solar regenerative power) onto a significantly larger vehicle, with significantly higher power requirements and much more variable array orientation. A more efficient system, specifically designed to be organically incorporated into the fundamental lighter-than-air structure, should be able to significantly reduce the weight and improve overall performance.

A regenerative power system, i.e., a power system able to extract energy from the environment rather than carrying consumable fuel, is a key enabling technology for persistent flight of lighter-than-air vehicles. Any means to increase the specific power (Watts/kilogram) and specific energy (Watt-hours/kilogram) of the power system will have a positive impact on airship performance.

The storage of large quantities of hydrogen and oxygen gas required for nighttime energy production comes with a very significant weight impact on the airship. Therefore, it would be desirable to store or provide hydrogen and oxygen, particularly for lighter-than-air systems, in ways that do not result in excessive weight for the system. In the case of hydrogen, current state of the art only enables a 15% weight efficient storage.

SUMMARY OF THE INVENTION

An energy management system for lighter-than-air vehicles which includes a reactor means for generating energy, storage means for storing the reactants used in the reactor means, and an integrated pipeless reactant and power distribution means.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE INVENTION

The present invention is related to energy management systems, including the generation, storage, transmission systems for lighter-than-air vehicles. The present invention is a system that leverages airship-specific components, materials and architectures to form an energy management system by integrating a photocatalytic reactor-based energy system or a regenerative fuel cell system, an integrated airship hydrogen and oxygen generator, a tankless reactant storage, and an integrated pipeless chemical and energy distribution system. This invention eliminates a significant fraction of the mass of the "stand-alone" power systems by integrating the functions into existing airship components, materials and structures. Thus, the present invention facilitates the elimination of much of this electrical conductor weight, since the airship helium volume effectively forms a 'chemical power bus', with the movement of potential energy from point to point in the airship being in the form of reactive chemicals ($H_2$ and $O_2$) and not conducted electrons. Further, each of the parts that are combined to constitute the energy generation, storage, and transmission system of the present invention has multiple potential implementations.

The lighter-than-air vehicle, which employs the components of the present invention, will be referred to as an LTA or LTA vehicle, but it can be appreciated that the present invention can be applied to any lighter-than-air vehicle, platform, or other inflated structure, which employs a flexible laminate construction, such as an aerostat, blimp, airship, balloon, or any floating object that is tethered or un-tethered, propelled or unpropelled, or used at any altitude. Further, while the LTA vehicle 10 is shown as including a hull 12 with stabilizing fins 15, the invention could be applied if no fins are provided. The hull 12 or containers within will contain a lifting gas, such as helium 11, a mix of helium and other gases, or other lifting gases. It is likely that at least one non-fin stabilizing element (e.g., a vectored fan) is employed. Also, hull 12 is shown as having an oblong configuration, it will be appreciated that any shape—sphere, ellipse, parabolic, tear-drop, and the like can be used, and the LTA vehicle 10 can carry a payload (not shown) which may include personnel, surveillance devices, weather monitoring equipment, communications equipment and the like. The size of payload varies in accordance with the size of the vehicle, and can be carried externally, internally, or incorporated into the material such as for radar transmit/receive applications. Still further, no propelling means, such as engines and/or propellers, is shown since the present invention can be employed on propelled as well as LTA vehicle having no means of propulsion.

Figure 1:
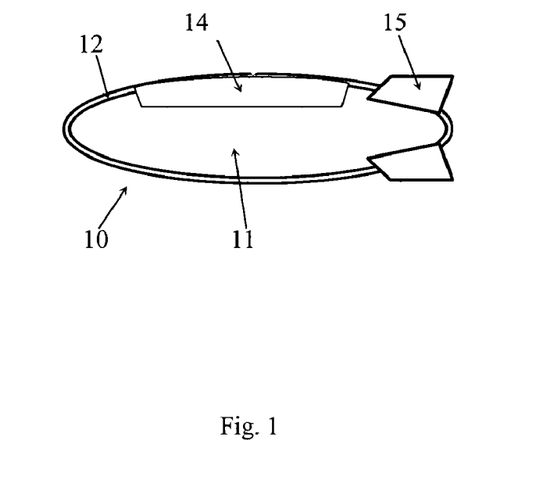
FIG. 1 is a schematic representation of a lighter-than-air vehicle.

As seen in FIG. 1, a lighter-than-air vehicle 10 consists of a skin 12, which may or may not be supported on a structural frame (not shown), and which contains a gas, such as helium, to provide lift for the LTA vehicle. Affixed to the top surface of the LTA vehicle are solar cells or photovoltaic cells 14 which take advantage of the exposure to sunlight and convert the solar energy to electrical energy for use by the LTA vehicle. The photovoltaic cells typically are attached to the outer fabric layer.

The core solar photocatalytic hydrogen and oxygen generation system, will enable the other parts of the system, such as the diffuse airship reactant storage system. The diffuse airship reactant storage system uses dilute storage within the airship's hull and inert lifting gas for safe storage of the hydrogen and/or oxygen and/or water vapor. The airship chemical power bus system builds upon the enabling features of the generation and storage systems. This leverages the dilute reactant storage within the airship hull to enable 'tapping' the stored chemical energy anywhere on the airship, with a reduced need for piping and/or cabling for power distribution.

The photocatalytic hydrogen and oxygen generation system of this invention fundamentally consists of a photocatalyst within the airship's internal volume, with provisions enabling a subset of the solar spectrum to reach the catalyst. This takes advantage of the accessibility of water vapor to the catalyst and the availability of the airship lifting gas (typically helium) as a diluent. The catalysts, in the presence of sufficiently energetic light spectrum, will cause a water vapor molecule to separate into its component hydrogen and oxygen atoms/molecules. This approach to splitting water into hydrogen and oxygen is significantly different than prior approaches which use electrical power generated by a solar array to drive an electrolyzer. This invention uses the sunlight directly, reducing the size and weight of the solar array and cabling, and eliminating the electrolyzer. A means is provided for gathering and separating the resultant reactant gases ($H_2$ and $O_2$), storing the gases separately for later use, and preventing the accumulation of unsafe concentrations that are subject to burning or exploding.

The catalysts are located within a helium volume of the airship on a suitable surface or matrix. Water vapor, for the purposes of splitting into hydrogen and oxygen, would be stored in the airship's primary helium volume. The water concentrations would always be very small with respect to the helium diluent, to minimize impact on the primary lifting function of the gas.

One approach would be to place the catalysts on the inside surface of a transparent or translucent section of the hull. This could be done as a coating added during the hull fabric manufacturing process, or added to the interior after hull assembly, in order to have the catalyst located in the main helium compartment(s) of the airship, with the hull constructed of transparent and/or translucent materials that permit transmission of light of the appropriate wavelengths. An advantage of this approach is the ability to have a very high macroscopic surface area with only minimal mass added to the airship since this will be essentially a coating having a two-dimensional nature. In a variant of this implementation, a means can be provided for moving the helium/water vapor mixture past the catalyst layer to minimize mass transfer limitations to the reaction rates, and to reduce unintended recombination. This provides a simple configuration conceptually. The use of hull materials that are translucent or transparent (wholly or partially) at the appropriate wavelengths will provide light accessibility through most or all of the airship hull and allow sunlight to be able to reach the catalyst bed throughout much of the day. As seen in FIG. 1, optical windows 20 can be provided in the hull to provide light accessibility, while much of the hull fabric remains opaque. Optical windows can be built into areas of the hull to enable light access to the catalyst beds, with the catalyst bed appropriately situated. Further, by circulating the helium/water vapor mix past the catalyst layer, the mass transfer limitations to reaction rates are minimized and recombination is reduced.

Figure 2:
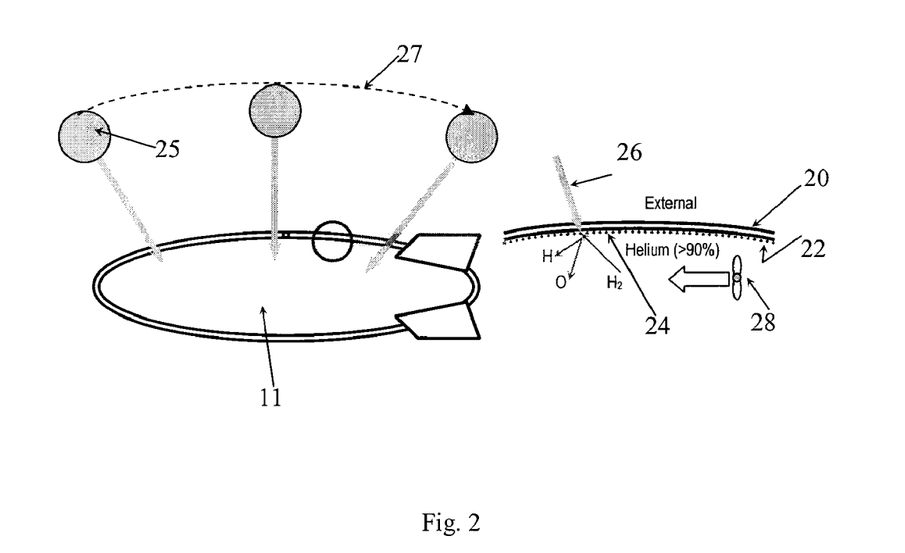
FIG. 2 is a schematic representation of a lighter-than-air vehicle in which the catalyst placement is on the inside of transparent or translucent main hull.
Figure 3:
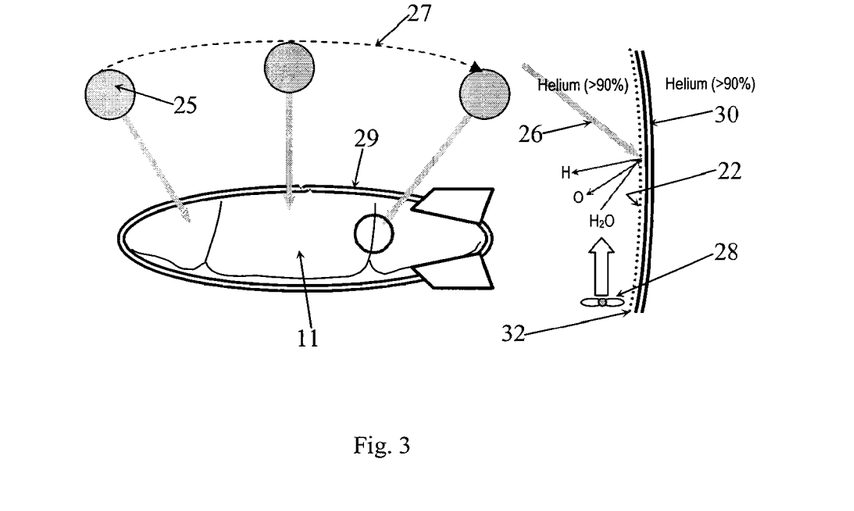
FIG. 3 is a schematic representation of a lighter-than-air vehicle in which the catalyst placement is on other surfaces or bulkheads inside the main hull.

As seen in FIG. 2, a photocatalyst coating 22 on the inside 24 of optical window 20 allows photons 26, in the form of light, to impact the photocatalyst 22 and cause the splitting of the water vapor into hydrogen and oxygen. The light is provided by the sun 25 which, due to airship direction changes and the Earth's orbit, will continually change position 27 with respect to the airship. A blower 28 may optionally be employed to improve mass flow and prevent recombination of the hydrogen and oxygen gases. FIG. 3 shows a variation of the system in FIG. 2 in that the photocatalyst is coated on an interior existing hull structure 30 and the coating 22 is on a surface 32 that is exposed to the light rays 26.

Figure 4:
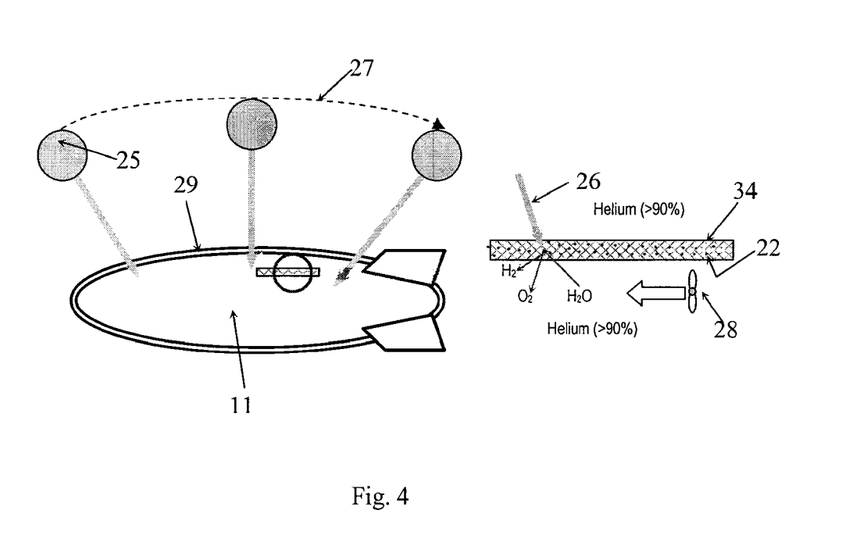
FIG. 4 is a schematic representation of a lighter-than-air vehicle in which the catalyst placement is on a matrix within the main hull.
Figure 5:
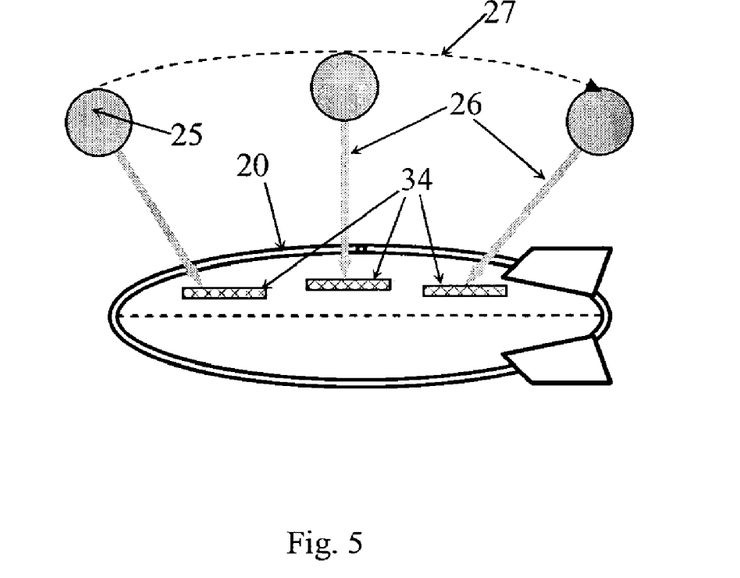
FIG. 5 is a schematic representation of a lighter-than-air vehicle in which the upper half is made of material transparent or translucent to the wavelength required for the catalysts.
Figure 6:
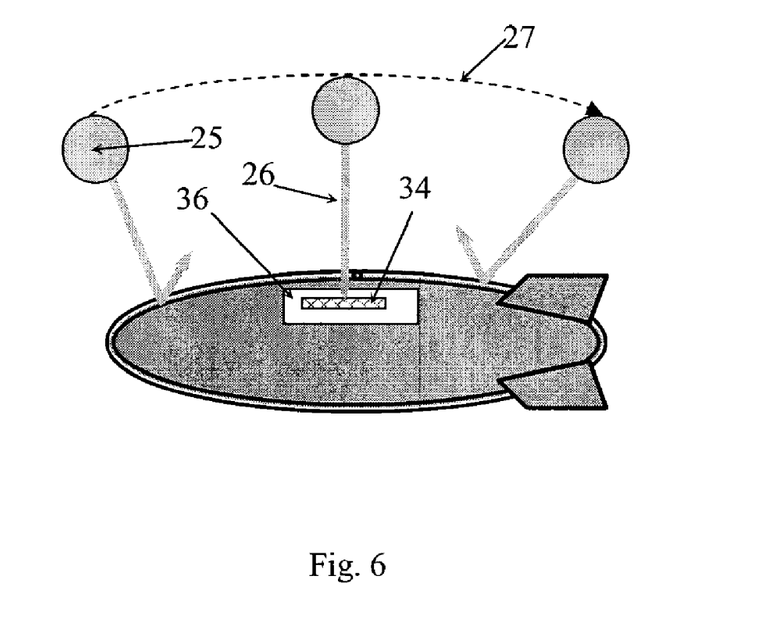
FIG. 6 is a schematic representation of a lighter-than-air vehicle in which the hull contains optical windows enabling entry of solar light.
Figure 7:
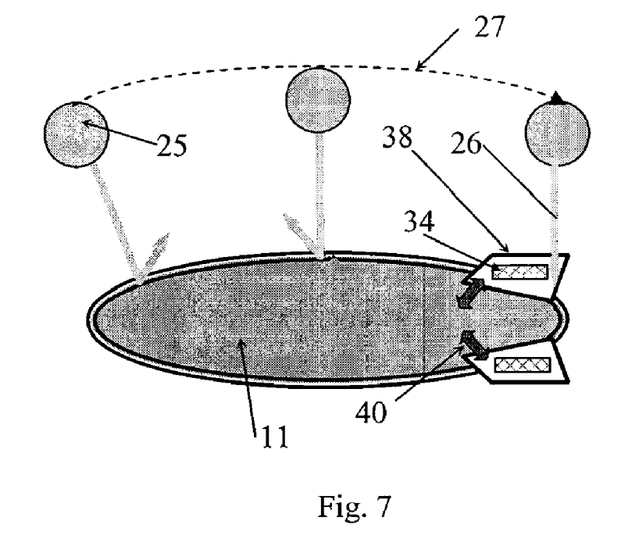
FIG. 7 is a schematic representation of a lighter-than-air vehicle in which the tail fins are composed of translucent or transparent material.
Figure 8:
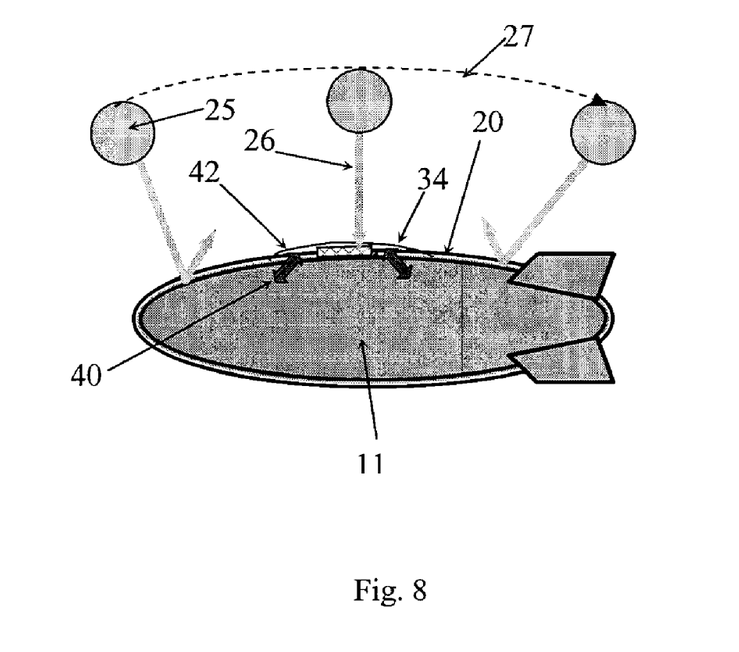
FIG. 8 is a schematic representation of a lighter-than-air vehicle in which the photocatalyst beds are mounted in a compartment on the outside of the primary structural hull.

Yet another approach, as shown in FIGS. 4 and 5, would be to place the catalyst 22 on an open, very porous three-dimensional matrix 34. This matrix would be very open, to enable light to access much of the interior. The catalyst/matrix structure would be located in the airship interior, and could be placed in any suitable location that had access to both external light and the helium/water vapor mix. The matrix 34 could be a singular element as shown in FIG. 4 or multiple elements, as is shown in FIG. 5. When there are multiple elements, the optical windows would be large or the entire surface of the LTA vehicle could be covered with transparent or translucent hull material 29. As shown in FIG. 6, catalyst support matrix could be placed in a reinforced window, which compensates for stress concentrations. The approach shown in FIG. 7 illustrates light access the catalyst bed 34 when it is placed in an inflated tail section 38 of the airship, or in a structurally rigid tail section having optical transparency or translucency, where at least some or all of the tail section would be transparent or translucent. This placement allows opaque materials to be used for the critical strength requirements of the primary hull. The tail fin volumes would have access to the helium volume of the overall airship via gas circulation means 40 such as a blower or fan configuration. As shown in FIG. 8, the catalyst support matrix can be placed in a transparent or translucent low-drag compartment or window 42 which is place on the exterior surface of the hull and a gas circulation means 40 employed to provide communication with the gases in the main hull.

For a regenerative hydrogen-oxygen energy storage system, such as a regenerative fuel cell (RFC), the generation of electricity at night creates water as a byproduct from the hydrogen and oxygen consumed in the fuel cell. This byproduct water is then used the next day to generate hydrogen and oxygen, either by photocatalysis, or electrolytically, using daytime sunlight as the primary power source. This cycle is repeated daily. Storage for the hydrogen, oxygen and water must all be accounted for, with the amounts set by the energy requirements of the system. Storage is usually an issue since the weight of the oxygen and hydrogen tankage used to store the reactants are by far the largest contributors to the overall RFC system weight. The electrical conductor cables are another significant mass where they are required to transfer electrical power throughout the airship.

The present invention enables the elimination of much of this electrical conductor weight, since the airship helium volume effectively forms a 'chemical power bus', with the movement of potential energy from point to point in the airship being in the form of reactive chemicals ($H_2$ and $O_2$) and not conducted electrons. Further, the present invention reduces or eliminates the need for a significant subset of this tankage, with a significant weight savings. This is done by storing one of the reactant gases (hydrogen or oxygen) in the helium volume, as a dilute species, as well as some or all of the water vapor.

A key aspect of this part is that the gases stored in the airship helium volume are stored as dilute species. This prevents any inadvertent reaction recombining the hydrogen and oxygen into water, or reaction of the hydrogen or oxygen with other internally exposed materials. This also minimizes the potential impact on the helium's role as the primary lifting gas. Further, a slight dilution can mitigate the breakdown voltage from electrical fields at stratospheric altitudes.

The present invention provides more weight efficient conversion of incident solar energy into stored chemical energy for nighttime power and reduction of chemical or electrical distribution and storage of energy by integrating into the hull and lifting gas. The result is a significantly improved airship performance by reducing power system weight.

As an example system, a 6 million cubic foot (MCF) helium-filled airship, floating at 60,000 ft., could safely contain a 2% hydrogen mix. This hydrogen, in a fuel cell system with average cell voltages of 0.8 volts, would provide the equivalent of over 600 kWh of energy.

Figure 9:
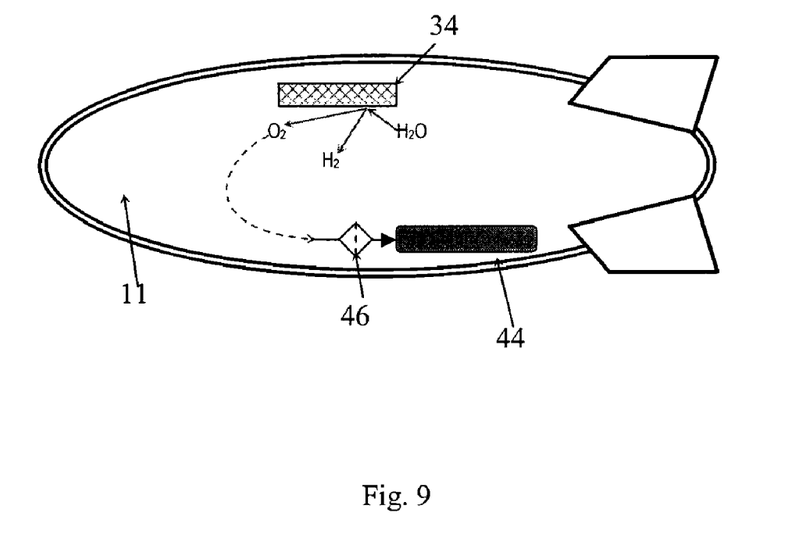
FIG. 9 is a schematic representation of a lighter-than-air vehicle in which, after photocatalysis, the oxygen gas is separated from the helium mix and stored.
Figure 10:
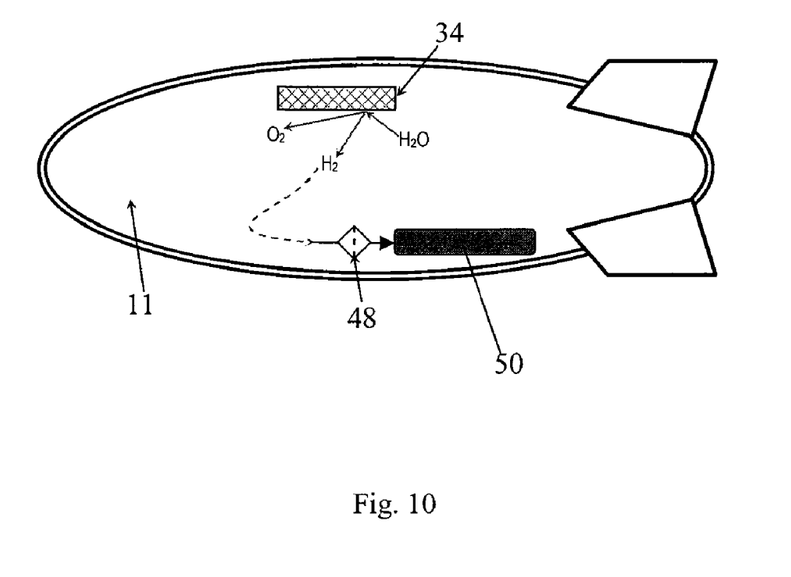
FIG. 10 is a schematic representation of a lighter-than-air vehicle in which, after photocatalysis, the hydrogen gas is separated from the helium mix and stored.
Figure 11:
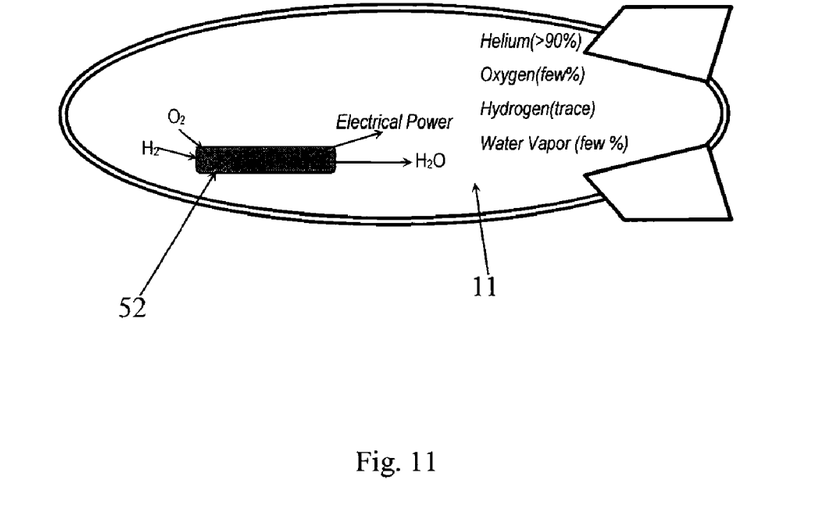
FIG. 11 is a schematic representation of a lighter-than-air vehicle in which the water vapor, which is generated by the power reaction process, is stored in the helium volume.

As seen in FIG. 9, a first approach to the storage system would entail hydrogen storage in the hull with the helium. The hydrogen and oxygen would be generated by a photocatalytic reactor 34 and the oxygen would be stored in a suitable storage container 44 after passing through an oxygen selective filter 46. In this approach the hydrogen quantities would necessarily be restricted to below the lower explosive limits. The hydrogen would actually provide additional lift. Conversely, as shown in FIG. 10, oxygen can be stored in the hull, with the helium, and the hydrogen would be removed through a hydrogen selective filter 48 and stored in a storage means 50. The oxygen would have a negative impact on helium lift, but this may be offset by thermal heating during the day. Another approach to the storage system, shown in FIG. 11 and compatible with previous approaches, would be to store the water vapor in the hull. The water vapor would be placed in the hull as the product of the energy generation system, whether via a hydrogen-oxygen fuel cell 52 or a combustor.

Figure 12:
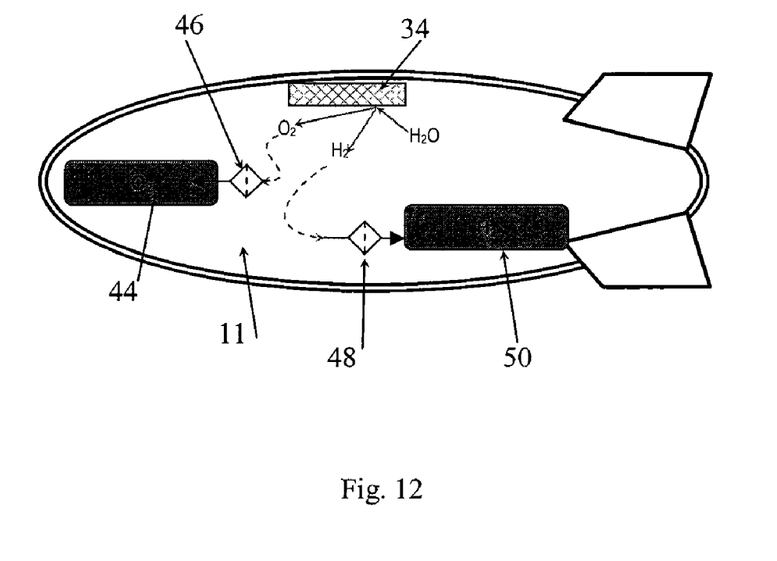
FIG. 12 is a schematic representation of a lighter-than-air vehicle in which, after photocatalysis, one gas is completely separated from the helium mix and stored, while the other gas is only partially separated.

Further, these could be used in many combinations, such as is shown in FIG. 12, including the partial separation of the gas and storage in the hull in storage means for the hydrogen and the oxygen, to enable storage of greater amounts than would be supported within helium dilution limits.

The storage could also be done with liquid water. While some water vapor would stay in vapor form in the helium, dependent on gas temperatures and concentrations, some water may be allowed to condense within the airship. Provision could be made using various techniques to condense (actively or passively) the water vapor into liquid form, and storing it in an appropriate area. This would be analogous to the core element of a basic home dehumidifier, in which a cold surface is created and the water condenses on that surface and flows off to be collected. During operations where additional water vapor was needed for photocatalysis, the water could be returned to the helium volume by heating.

Alternatively, a separate pressurized compartment could be provided on the exterior of the main helium volume of the airship. This might encompass the entire airship main hull, or could be simply one or more 'bubbles' mounted on the airship, configured to minimize drag. These compartments or bubbles would be, in a sense, contiguous with the primary helium volume of the airship, but separated with a compressor or blower to maintain a slight overpressure in the bubble. A key benefit of this particular approach is to enable the use of a lower strength clear hull fabric on the outside of the bubble, while using an opaque material underneath the bubble, as the main hull structure. This inner surface could also be optimized optically to reflect any light reaching the backside of the bubble, minimizing thermal flux into the airship main hull.

The present invention effectively uses the entire helium volume to transfer power from the point of generation to the point of storage across the airship without wires or pipes. This would also enable localized generation of nighttime power, with the positioning of smaller fuel cells near major loads, such as the propulsors. The multi-faceted aspects of this invention enable this approach due to the elimination of a significant fraction of the reactant tankage. The other gas (non-helium-stored) could either be concentrated and collected locally, or piped from a main storage tank.

For example, one gas, such as hydrogen, can be stored in whole or in significant part in a dilute form in the main helium compartment. Due to diffusion and convection, this dilute form of the gas (either hydrogen or oxygen) will be available at all points within the helium. If hydrogen is generated in a catalyst array near the top of the airship, it will diffuse throughout the helium volume. A fuel cell located at the bottom of the airship would simply flow this helium/hydrogen mix either directly through a cell stack, or through a concentrator, then the cell stack, tapping it from the bottom. No electrical conductors, or chemical pipes, are required to move this energy in chemical or electrical from the top of the airship where it is generated to the bottom. The other gas that is not stored in the helium in significant quantities, can be extracted from the helium wherever it is convenient on the airship and stored. One possible location would be at the bottom of the airship, where the extraction system could tap into the main helium volume that contains the very dilute species. Also, as water vapor is generated during the release of energy at nighttime, by a fuel cell or hydrogen-oxygen combustion system, it is allowed to mix into the helium. This water would probably be generated where the fuel cell is at the bottom of the airship, and would then reach the catalyst bed for dissociation the next day by diffusion and convection within the airship. Thus, both the chemical reactants and the energy can be distributed without the need for piping and its additional weight.

From the above description of the invention, those skilled in the art will perceive improvements, changes and modifications. Such improvements, changes and modifications within the skill of the art are intended to be covered by the appended claims.

What I claim is:

1. An energy management system for lighter-than-air vehicles comprising
   A. a reactor means for generating energy,
   B. storage means for storing the reactants used in the reactor means, and
   C. an integrated pipeless reactant and power distribution means.

2. The system of claim 1 wherein the reactor means is a photocatalytic reactor.

3. The system of claim 1 wherein the reactor means is a regenerative fuel cell.

4. The system of claim 1 wherein the storage means is the lifting gases of the vehicle.

5. The system of claim 1 wherein the storage means is a combination of the lifting gases of the vehicle and a selective gas storage system.

6. The system of claim 1 wherein the lighter-than-air vehicle has means which are part of the vehicle hull and which permit the passage of selective spectrum lightwaves, and the reactor means is in the interior of the hull and is positioned to receive said selective spectrum lightwaves.

7. The system of claim 6 wherein the reactor means is on the interior surface of the exterior wall of the hull.

8. The system of claim 6 wherein the reactor means is on an interior structural surface.

9. The system of claim 1 wherein the storage means is the lifting gas inside the hull of the lighter-than-air vehicle.

10. The system of claim 1 wherein the storage means is the lifting gas inside the hull of the lighter-than-air vehicle and hydrogen is stored in the lifting gas.

11. The system of claim 1 wherein the storage means is the lifting gas inside the hull of the lighter-than-air vehicle and oxygen is stored in the lifting gas.

12. The system of claim 1 wherein the storage means is a storage tank.

13. The system of claim 1 wherein the reactants for the reactor means are stored in the lifting gas for the vehicle and are transported from storage to reaction by diffusion and convection.

14. The system of claim 1 wherein the reactants for the reactor means are converted into water for storage and said water is disassociated into reactants prior to consumption.

* * * * *